(12) United States Patent
Uchii et al.

(10) Patent No.: US 9,494,466 B2
(45) Date of Patent: Nov. 15, 2016

(54) TEMPERATURE MEASUREMENT DEVICE (71) Applicant: KABUSHIKI KAISHA TOSHIBA, Minato-ku (JP)

(72) Inventors: Toshiyuki Uchii, Kanagawa-ken (JP); Tadashi Mori, Kanagawa-ken (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 289 days.

(21) Appl. No.: 14/169,651

(22) Filed: Jan. 31, 2014

(65) Prior Publication Data
US 2014/0219312 A1 Aug. 7, 2014

(30) Foreign Application Priority Data

Feb. 4, 2013 (JP) ................. 2013-019295

(51) Int. Cl.
*G01J 5/00* (2006.01)
*G01J 5/60* (2006.01)
(Continued)

(52) U.S. Cl.
CPC .............. G01J 5/0014 (2013.01); G01J 5/602 (2013.01); *G01J 5/06* (2013.01); *G01J 5/0821* (2013.01); *G01J 5/0896* (2013.01); *G01J 2005/0051* (2013.01); *G01J 2005/0074* (2013.01); *G01K 11/12* (2013.01)

(58) Field of Classification Search
CPC ................ G01J 2005/0051; G01J 2005/0074; G01J 5/003; G01J 5/0014; G01J 5/06; G01J 5/0821; G01J 5/0896; G01J 5/602; G01K 11/00; G01K 11/12
USPC ................ 374/121, 128, 127, 129, 161, 162
See application file for complete search history.

(56) References Cited

U.S. PATENT DOCUMENTS

| | | | |
|---|---|---|---|
| 6,780,657 B2 * | 8/2004 | Ino ...................... | G01J 5/0003 438/14 |
| 2010/0055001 A1 * | 3/2010 | Ikeda ................... | G01N 21/71 422/108 |

(Continued)

OTHER PUBLICATIONS

Gojani, Ardian. "Experimental Study of Laser-Induced Brass and Copper Plasma for Spectroscopic Applications," ISRN Spectroscopy, vol. 2012, Article ID 868561, 8 pages, 2012. Accessed Online <http://www.hindawi.com/journals/isrn/2012/868561/>.*

(Continued)

*Primary Examiner* — Lisa Caputo
*Assistant Examiner* — Jonathan Dunlap
(74) *Attorney, Agent, or Firm* — Oblon, McClelland, Maier & Neustadt, L.L.P.

(57) ABSTRACT

A temperature measurement device is provided with: light collection means; extraction means; optical intensity calculation means; and temperature measurement means. The light collection means collects the emission spectrum of a measurement subject. The extraction means extracts light having the wavelength of the atomic spectral lines and light having a wavelength in a wavelength region where there are no atomic spectral lines, from the emission spectrum collected by the aforementioned light collection means. The optical intensity calculation means calculates the optical intensities of the light extracted by the aforementioned extraction means. The temperature measurement means calculates the temperature of the aforementioned measurement subject, based on the intensities of the beams calculated by the aforementioned optical intensity calculation means.

7 Claims, 5 Drawing Sheets (51) Int. Cl.
G01J 5/08 (2006.01)
G01K 11/12 (2006.01)
G01J 5/06 (2006.01)

(56) References Cited

U.S. PATENT DOCUMENTS

2010/0309463 A1* 12/2010 Lucke .................. G01J 3/02
356/301
2015/0131700 A1* 5/2015 Chrystie ............... G01J 5/0014
374/161

OTHER PUBLICATIONS

Penner, S. S. "Spectroscopy methods of temperature measurements". Temperature; Its Measurement and Control in Science and Industry, vol. Three, pp. 561-574, 1962. Accessed Online <http://authors.library.caltech.edu/21878/>.*

Babich et al. "Effective dissociation temperature for estimation of electic arc plasma composition". ISSN 1562-6016, Problems in Atomic Science and Technology (Voprosy Atomnoj Nauki i Tekhniki). 2011. No. 1. Series Plasma Physics 17. Accessed Online <http://vant.kipt.kharkov.ua/ARTICLE/VANT_2011_1/article_2011_1_98.pdf>.*

Okuda et al. "Spectroscopic Approach to the Analysis of High Current Arcs in SF6". IEEE Transactions on Plasma Science, vol. 8, issue 4, pp. 395-399, 1980. Accessed Online <http://ieeexplore.ieee.org/stamp/stamp.jsp?arnumber=4317346>.*

Fornarini et al. "Influence of laser wavelength on LIBS diagnostics applied to the analysis of ancient bronzes". Analytical and Bioanalytical Chemistry, May 2006, vol. 385, Issue 3, pp. 272-280. Accessed Online <http://link.springer.com/article/10.1007%2Fs00216-006-0300-1>.*

Unnikrishnan et al. "Measurements of plasma temperature and electron density in laser-induced copper plasma by time-resolved spectroscopy of neutral atom and ion emissions". Pramana, Jun. 2010, vol. 74, Issue 6, pp. 983-993. Accessed Online <http://link.springer.com/article/10.1007/s12043-010-0089-5>.*

Takeuchi et al. "Temperature and Metal Vapor Near the Cathode in Copper Breaking Arcs According to Spectroscopic Measurement". IEEE Transactions on Plasma Science, vol. 28, No. 3, Jun. 2000. Accessed Online <http://ieeexplore.ieee.org/stamp/stamp.jsp?arnumber=887767>.*

Gornushkin et al. "Automatic Correction of Continuum Background in Laser-Induced Breakdown and Raman Spectrometry". Applied Spectroscopy, vol. 57, Issue 2, pp. 197-207, 2003. Accessed Online <https://www.osapublishing.org/as/abstract.cfm?uri=as-57-2-197>.*

Chinese Office Action dated Mar. 29, 2016 in counterpart Chinese patent application No. 201410044846.5, citing documents AW-AZ (21 pages).

* cited by examiner

TEMPERATURE MEASUREMENT DEVICE

CROSS-REFERENCE TO RELATED APPLICATION

This application claims benefit of priority from Japanese Application No. JP2013-19295 filed Feb. 4, 2013; the entire contents of which are incorporated by reference herein.

FIELD

Embodiments described herein relate generally to a temperature measurement device.

BACKGROUND

In order to measure the temperature of a plasma, which is a high-speed transient phenomenon, the method has been considered of calculating the temperature by measuring the light emitted by the plasma. Conventionally, the method has been considered of finding the temperature by selectively simultaneously detecting the intensity of two atomic spectral lines that are emitted by the plasma and calculating the temperature from the ratio of their intensities. However, this method is subject to the problem that, as well as the atomic spectral lines, the plasma emission spectrum contains a continuous optical component, so when this continuous optical component is added in, the measurement accuracy is lowered. An example of such a method is described in Takeuchi et al. "Temperature and Metal Vapor Near the Cathode in Copper Breaking Arcs According to Spectroscopic Measurement", IEEE Transactions on Plasma Science, Vol. 28, No. 3, pp. 991-999, 2000 (hereinafter referred to as Non-Patent Reference).

SUMMARY

In order to solve the problem described above, there is provided a temperature measurement device that measures temperature accurately using the emission spectrum of the measurement subject.

In order to achieve the aforementioned object, in this embodiment, a temperature measurement device comprises the following construction.

Specifically, it comprises light collection means, extraction means, optical intensity calculation means, and temperature measurement means. The light collection means collects the emission spectrum of the measurement subject. The extraction means extracts light having wavelengths of an atomic spectral lines, and light having a wavelength in a wavelength region where there are no atomic spectral lines from the emission spectrum collected by the aforementioned light collection means. The optical intensity calculation means calculates the intensity of the respective beams extracted by the aforementioned extraction means. The temperature measurement means calculates the temperature of the aforementioned measurement subject, based on the intensities of the respective beams calculated by the aforementioned optical intensity calculation means.

DETAILED DESCRIPTION OF THE PREFERRED EMBODIMENTS (First Embodiment)

First of all, a first embodiment will be described.

A temperature measurement device according to the first embodiment measures the temperature of a measurement subject using the emission spectrum of the measurement subject. Specifically, the temperature measurement device selectively detects two atomic spectral lines of the emission spectrum of the measurement subject and an optical component having a wavelength other than the wavelength of the atomic spectral lines, and measures the temperature of the measurement subject from their respective intensities.

The temperature measurement device measures the intensities (IA and IB) of optical components having the two wavelengths ($\lambda a$ and $\lambda b$) of these atomic spectral lines, of the emission spectrum. In addition, the temperature measurement device measures the intensity (IC) of an optical component having a wavelength ($\lambda c$) other than the wavelength of the atomic spectral lines, of the emission spectrum. The temperature measurement device then calculates the temperature of the measurement subject from the intensity IA of the optical component having the wavelength $\lambda a$, the intensity IB of the optical component having the wavelength $\lambda b$, and the intensity IC of the optical component having the wavelength $\lambda c$.

Figure 1:
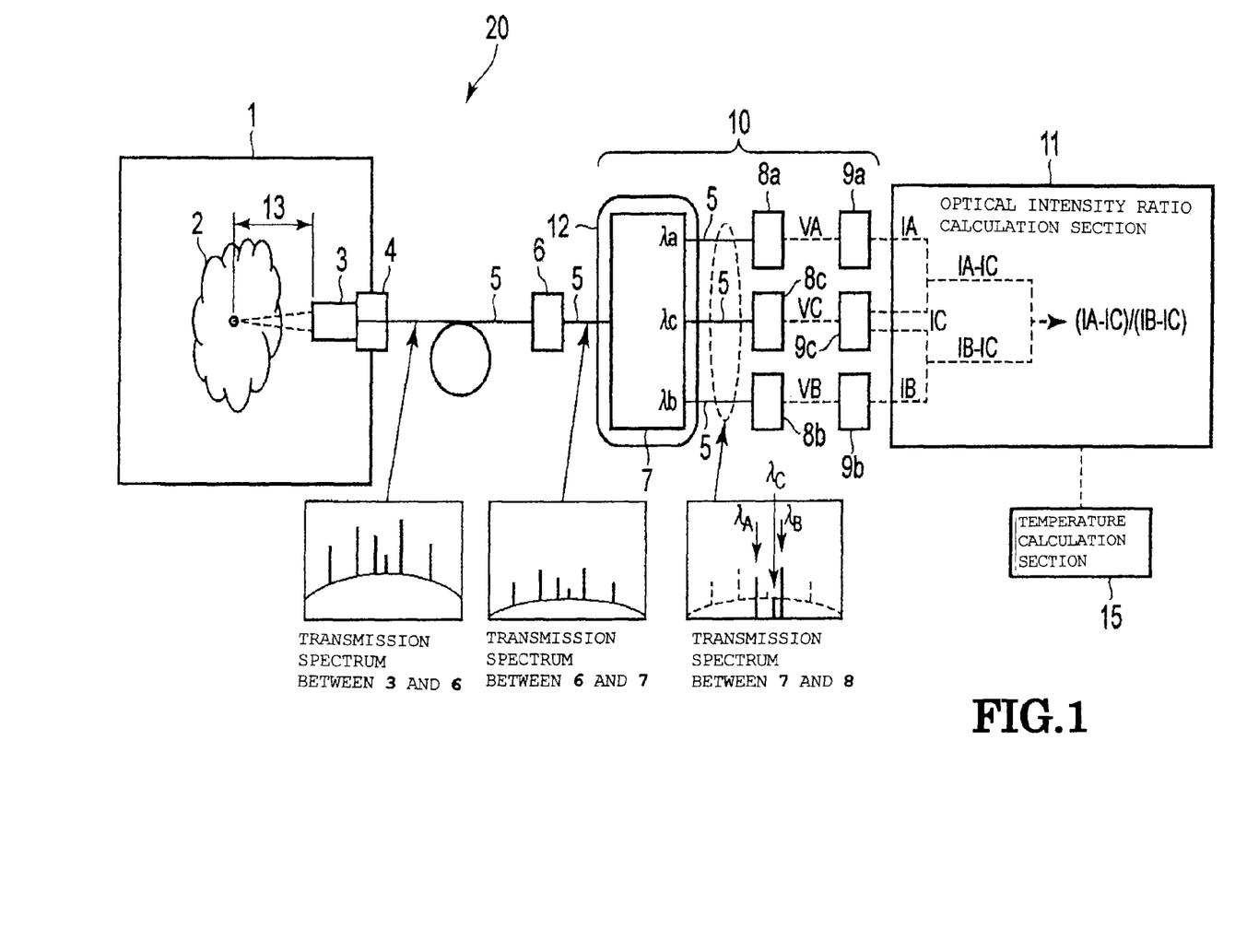
FIG. 1 is a view showing diagrammatically an example layout of a temperature measurement device according to a first embodiment.

FIG. 1 is a view showing diagrammatically an example layout of a temperature measurement device 20 according to a first embodiment. As shown in FIG. 1, a temperature measurement device 20 comprises: an individual container 1 that accommodates a measurement subject 2; an optical input section 3 that collects the light of the emission spectrum of the measurement subject in the individual container 1; an adapter 4 that holds the optical input section 3 in a fixed manner; a transmission section 5 that transmits the emission spectrum collected by the optical input section 3; an amount of light adjustment section 6 that adjusts the amount of light of the emission spectrum collected by the optical input section 3; a specified wavelength intensity detection section 10 that detects the intensity of a spectral line having a specified wavelength, from the emission spectrum whose amount of light has been adjusted by the amount of light adjustment section 6; an optical intensity ratio calculation section 11 that calculates the intensity ratio of the atomic spectral lines from each of the spectral intensities detected by the specified wavelength intensity detection section 10; and a temperature calculation section 15.

The specified wavelength intensity detection section 10 comprises a wavelength selection section 7 that selects and extracts light having a specified wavelength from the emission spectrum wherein the amount of light has been adjusted by the amount of light adjustment section 6, detectors 8a to 8c that output voltages dependent on the intensity of the light extracted by the wavelength selection section 7, and calibration sections 9a to 9c that calculate the intensity of the light from the voltages output by the detectors 8a to 8c. The wavelength selection section 7 is arranged within a temperature adjustment section 12 that adjusts the temperature of the interior to a fixed value.

The individual container 1 has a space that stores a measurement subject 2 in its interior. The space provided by the individual container 1 is of a size and shape in accordance with that of the measurement subject 2. For example, the individual container 1 may be a container of cylindrical shape or box shape, but the shape of the individual container 1 is not restricted to a specific shape.

The individual container 1 has a strength capable of withstanding for example shock or heat generated by the measurement subject 2. For example, the individual container 1 may be formed of metal or the like, but the substance used to constitute the individual container 1 is not restricted to a specific substance.

For example, the individual container 1 may be a container such as is employed as a power gas circuit breaker or in other applications such as the cylinder of an internal combustion engine. Also, the individual container 1 may be a container for measuring the measurement subject 2.

The inside surface of the individual container 1 is processed to a specular finish at least in the portion that enters the range of the field of view of the optical input section 3. Specifically, as the light emitted by the individual container 1, the optical input section 3 collects only the light that is emitted at this inside surface that is processed to a specular finish. Such a substance that has been processed to a specular finish emits light whose intensity shows little variation with change in temperature. Consequently, the portion of the optical input section 3 of the inside surface of the individual container 1 that enters the range of field of view emits light whose intensity shows little variation with change in temperature. Consequently, the optical input section 3 can collect the emission spectrum of the measurement subject 2 with no possibility of the light that is emitted and collected being influenced by change of temperature of the individual container 1.

A hole that communicates with the interior is provided in part of the individual container 1, for the purpose of installing an adapter 4 therein. The hole is provided in a position in the vicinity of the measurement subject 2, so as to facilitate collection of the emission spectrum of the measurement subject 2, but is not restricted to being in a specific position.

The measurement subject 2 is the object whose temperature is being measured by the temperature measurement device 20. The measurement subject 2 may be for example a phenomenon (instantaneous phenomenon) whereby an abrupt change in temperature occurs in a short time (for example from a few milliseconds to a few microseconds). For example, the measurement subject 2 could be an explosion, combustion, plasma or a chemical reaction. However, the measurement subject 2 is not restricted to instantaneous phenomena and is not restricted to specific substances or phenomena.

The optical input section 3 collects the emission spectrum of the measurement subject 2 from its tip. Also, the optical input section 3 supplies the collected emission spectrum to the amount of light adjustment section 6 through a transmission line 5. The optical input section 3 is held by the adapter 4. The optical input section 3 may be arranged projecting into the interior of the individual container 1, or may be embedded in the adapter 4 without projecting into the interior of the individual container 1. Also, the surface layer section of the optical input section 3 facing the measurement subject 2 has a strength capable of withstanding for example shock or heat generated by the measurement subject 2. The surface section of the optical input section 3 facing the measurement subject 2 is formed for example of heat-resistant glass or toughened glass.

Also, the optical input section 3 is provided with a lens having a focal point distance 13 or a focal distance 13 in its interior. By means of this lens, the optical input section 3 can collect light from a portion that is separated from the input section 3 by the focal point distance 13. Specifically, the optical input section 3 can thereby collect the emission spectrum generated by the portion (measurement location) of the measurement subject 2 that is separated from the optical input section 3 by the focal point distance 13. As a result, the temperature measurement device 20 can measure the temperature of the aforementioned measurement location of the measurement subject 2. Also, the focal point distance 13 of the lens can be altered at will. In this way, the location at which the temperature is measured by the temperature measurement device 20 can easily be altered.

The adapter 4 holds the optical input section 3 fixed. The adapter 4 is installed in the individual container 1 in such a way as to block the hole that is provided in the individual container 1. Also, the adapter 4 holds fixed one end of the transmission line 5. The adapter 4 optically connects the optical input section 3 and the transmission line 5 by holding the transmission line 5 and the optical input section 3 fixed.

The transmission path 5 transmits the emission spectrum collected by the optical input section 3 to the amount of light adjustment section 6. Also, the transmission path 5 transmits to the wavelength selection section 7 the emission spectrum whose amount of light has been adjusted by the amount of light adjustment section 6. Also, the transmission path 5 transmits to the detectors 8*a*, 8*b*, 8*c* the light that is supplied by the wavelength selection section 7. The transmission path 5 has the function of transmitting light from one end of the transmission path 5 to the other end. The transmission path 5 may be for example an optical fiber.

The amount of light adjustment section 6 adjusts the amount of light of the emission spectrum supplied by the optical input section 3 to a suitable amount of light. Specifically, the amount of light adjustment section 6 adjusts the amount of light of the emission spectrum supplied by the optical input section 3 to an amount of light capable of detection by the detectors 8*a* to 8*c*. Specifically, the amount of light adjustment section 6 reduces all of the optical components of the emission spectrum in a uniform ratio. For example, if the amount of light of the emission spectrum that is supplied by the optical input section 3 exceeds the amount of light that can be detected by the detectors 8, no difference in intensity of the atomic spectral lines detected by the detectors 8 is manifested, so the temperature measurement device 20 cannot calculate the temperature of the measurement subject 2. In this case, the amount of light adjustment section 6 would reduce the amount of light of the emission spectrum to an amount of light that can be detected by the detectors 8. Also, if the amount of light adjustment section 6 reduces the amount of light of the emission spectrum excessively, the signal/noise ratio (S/N ratio) of the emission spectrum is degraded. The amount of light adjustment section 6 therefore adjusts the amount of light of the emission spectrum to a degree such that it can be detected by the detectors 8 but the signal/noise ratio is not degraded.

Also, the amount of light adjustment section 6 supplies the emission spectrum, whose amount of light has been thus adjusted, through the transmission path 5 to the wavelength selection section 7.

The wavelength selection 7 extracts only light having a specified wavelength from the emission spectrum that is supplied by the amount of light adjustment section 6. In this embodiment, the wavelength selection section 7 extracts light having the wavelengths λa and λb of two atomic spectral lines, and light having a single wavelength λc, in a wavelength region which is not that of the atomic spectral lines.

λa, λb and λc are determined in accordance with the measurement subject 2 and are not restricted to specific wavelengths.

For example, if the measurement subject 2 is the arc plasma generated in a gas containing sulfur hexafluoride (SF6) using electrodes containing copper, λa and λb may be any of the wavelengths: 493 nm, 500 nm, 502 nm, 504 nm, 507 nm, 511 nm, 515 nm, 518 nm, 522 nm, 540 nm, 548 nm, 553 nm, 561 nm, 565 nm, 567 nm, 571 nm, 579 nm, 586 nm, 625 nm, 636 nm, 642 nm, 657 nm, 658 nm, 677 nm, 688 nm, 684 nm, 686 nm, 689 nm, 691 nm, 705 nm, 714 nm, 721 nm, 732 nm, 734 nm, 741 nm, 743 nm, 744 nm, 749 nm, 750 nm, 755 nm, 757 nm, 776 nm, or 781 nm. In this case, λc is set to a wavelength other than the wavelengths listed above.

Also, when the measurement subject 2 is an arc plasma generated in a gas including carbon dioxide (CO2) using electrodes containing copper, λa and λb may have any of the wavelengths: 493 nm, 502 nm, 504 nm, 507 nm, 511 nm, 515 nm, 522 nm, 561 nm, 579 nm, 741 nm, or 743 nm. In this case, λc is set to a wavelength other than the wavelengths listed above.

For example, a construction may be adopted in which the wavelength selection section 7 resolves the emission spectrum using for example a diffraction grating or prism, and only light of the specified wavelength is picked up by an optical fiber or the like. Also, a construction may be adopted in which the wavelength selection section 7 branches the emission spectrum using a beam splitter and only light of a specified wavelength is allowed to pass by a narrow wavelength band interference filter. In selection of the wavelength of the light that is extracted from the aforementioned group of wavelengths by the wavelength selection section 7, the transmission wavelength bandwidth of the interference filter may suitably be about 3 nm. The method and construction whereby the wavelength selection section 7 extracts only light of a specified wavelength are not restricted to a specific arrangement.

The wavelength selection section 7 supplies the extracted light to each detector 8 through the transmission path 5. In this case, the wavelength selection section 7 supplies light having the wavelength λa to the detector 8a, supplies light having the wavelength λb to the detector 8b, and light having the wavelength λc to the detector 8c.

The wavelength selection section 7 is arranged within the temperature adjustment section 12. The temperature adjustment section 12 has the function of maintaining the temperature within the interior fixed. The temperature adjustment section 12 maintains the temperature of the wavelength selection section 7 at a fixed temperature. The wavelength selection section 7 employs for example an ordinary spectroscope or a filter that passes only a specified wavelength band. The temperature characteristics of such components are susceptible to change in temperature. The temperature adjustment section 12 is therefore employed to prevent lowering of the accuracy of the wavelength selection section 7 by change of temperature, by keeping the temperature of the wavelength selection section 7 fixed.

The detectors 8 (8a, 8b, 8c) convert the light that is extracted by the wavelength selection section 7 into voltage. The detectors 8 convert the light that is generated by a phenomenon that takes place for a very short time (a few milliseconds to a few microseconds) into voltage, and so should generate voltage with a response time of the order of a few microseconds. For example, the detectors 8 may be photodiodes or photomultiplier tubes. Also, the detectors 8 may be arranged independently on the light beams having specified wavelengths. The detectors 8 can therefore convert the respective light beams having specified wavelengths into voltages simultaneously.

The detectors 8 are electrically connected with calibration sections 9. The detectors 8 supply the voltage which they generate to the calibration sections 9. Specifically, the detector 8a supplies voltage to the calibration section 9a, the detector 8b supplies voltage to the calibration section 9b and the detector 8c supplies voltage to the calibration section 9c.

The calibration sections 9 (9a, 9b, 9c) calculate the intensity of the light that is supplied by the wavelength selection section 7 to the detectors 8, from the voltages that are supplied by the detectors 8. The voltage that is output by the detectors 8 is not linear with respect to the intensity of the supplied light. Usually, when the intensity of the light that is supplied to the detectors 8 increases, the ratio of the output voltage with respect to the intensity of the light decreases. Specifically, when the intensity of the light that is supplied to the detectors 8 increases, the efficiency of the conversion of the light to voltage is lowered. The calibration sections 9 calculate the intensity of the light that is supplied to the detector 8 by the wavelength selection section 7, from the voltage that is supplied by the detectors 8, based on the characteristics of the detectors 8. The calibration sections 9 may be computation circuits and may be constituted for example by a PC.

The calibration sections 9 are electrically connected with an optical intensity ratio calculation section 11. The calibration sections 9 supply information indicating the calculated intensity of the light to an optical intensity ratio calculation section 11. The calibration section 9a supplies information indicating the intensity (IA) of light having a wavelength λa to the optical intensity ratio calculation section 11. The calibration section 9b supplies information indicating the intensity (IB) of light having a wavelength λb to the optical intensity ratio calculation section 11. The calibration section 9c supplies information indicating the intensity (IC) of light having a wavelength λc to the optical intensity ratio calculation section 11.

The optical intensity ratio calculation section 11 calculates the intensity ratio of two atomic spectral lines, based on the information indicating the intensity of light that is supplied from the calibration sections 9. The calculation procedure is described below.

Figure 2:
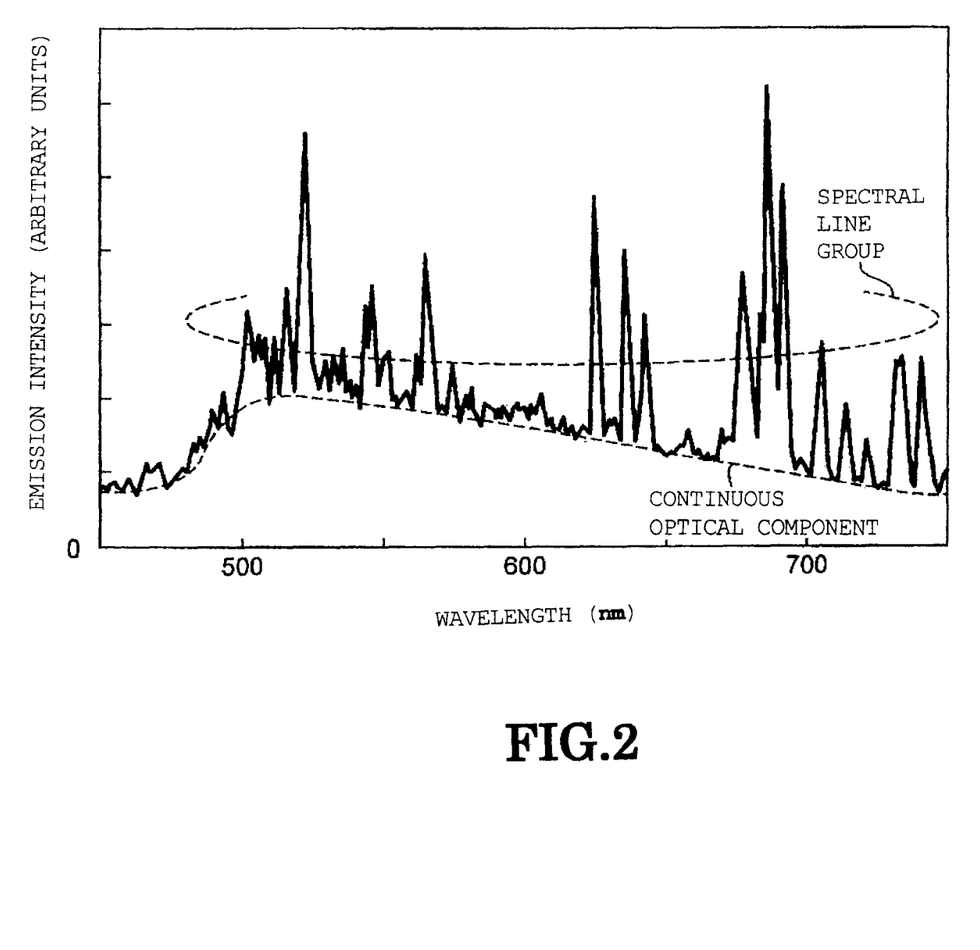
FIG. 2 is a view showing an example of a plasma emission spectrum.

The emission spectrum of the measurement subject 2 includes a continuous component, constituting noise, together with the atomic spectral lines. FIG. 2 is a view showing an example of the emission spectrum of the measurement subject 2. As shown in FIG. 2, the atomic spectral lines (spectral lines) are formed superimposed on the continuous optical component. Consequently, if the optical intensity ratio calculation section 11 were to attempt to calculate the intensity ratio of the atomic spectral lines simply utilizing the intensity of the light having the wavelengths of the atomic spectral lines, it would be unable to calculate the intensity ratio of the atomic spectral lines accurately, because of this continuous optical component.

The optical intensity ratio calculation section 11 calculates the intensity ratio of the atomic spectral lines, removing the intensity of the continuous optical component. Specifically, the optical intensity ratio calculation section 11 calculates the intensity of the atomic spectral lines emitted from the measurement location of the measurement subject 2, subtracting the intensity of the continuous optical component from the intensity of the light having the wavelengths of the atomic spectral lines. Specifically, since the light having the wavelength λc is light of a wavelength region where there are no atomic spectral lines, the intensity of the light having the wavelength λc is the intensity of the continuous optical component. Consequently, by subtracting the intensity of the light having the wavelength λc from the intensities of the light having the wavelength λa and the light having the wavelength λb of the atomic spectral lines, the optical intensity ratio calculation section 11 is able to calculate the intensities of the atomic spectral lines emitted by the measurement subject 2. The optical intensity ratio calculation section 11 calculates the intensity ratio of the atomic spectral lines emitted by the measurement location of the measurement subject 2, from the calculated intensities of the atomic spectral lines.

According to an embodiment, the calibration section 9a calculates the intensity (IA) of the light having the wavelength λa and supplies information indicating the calculated intensity to the optical intensity ratio calculation section 11. The intensity indicated by the information supplied by the calibration section 9a is the intensity in a condition in which the continuous optical component is added to the atomic spectral lines emitted by the measurement subject 2.

Also, the calibration section 9c calculates the intensity (IC) of the light having the wavelength λc, and supplies information indicating this calculated intensity to the optical intensity ratio calculation section 11. The wavelength λc is not any of the atomic spectral line wavelengths, so the intensity indicated by the information supplied by the calibration section 9a is the intensity of the continuous optical component.

Consequently, the optical intensity ratio calculation section 11 can obtain the atomic spectral line intensity (In) of the wavelength λa that is emitted by the measurement subject 2, by subtracting IC from IA. Likewise, the optical intensity ratio calculation section 11 can obtain the atomic spectral line intensity (Im) of the wavelength λb that is emitted by the measurement subject 2, by subtracting IC from IB. Accordingly, the optical intensity ratio calculation section 11 can calculate the intensity ratio (In/Im) of the atomic spectral lines by using the following expression.

$$In/Im = (IA - IC)/(IB - IC)$$

The optical intensity ratio calculation section 11 may be a computation circuit and may be constituted for example by a PC.

The optical intensity ratio calculation section 11 is electrically connected with a temperature calculation section 15. The optical intensity ratio calculation section 11 transmits information indicating the calculated intensity ratio of the atomic spectral lines to the temperature calculation section 15.

The temperature calculation section 15 calculates the temperature of the measurement location of the measurement subject 2, based on the information indicating the intensity ratio of the atomic spectral lines that is delivered by the optical intensity ratio calculation section 11. The temperature calculation section 15 can calculate the temperature using the following Expression (see Non-Patent Reference 1).

[Math 1]

$$T = \frac{E_m - E_n}{k \cdot \ln\left(\frac{I_n \cdot \lambda_n}{I_m \cdot \lambda_m} \cdot \frac{g_m \cdot A_m}{g_n \cdot A_n}\right)} \quad \text{Expression (1)}$$

where k is the Boltzmann constant: $8.62 \times 10^{-5}$ (eV K$^{-1}$)

$E_m$, $E_n$ are the excitation energy levels (eV) corresponding to the atomic spectral lines $g_m$, $g_n$ are statistical weighting factors corresponding to the atomic spectral lines, and $A_m$, $A_n$ are the transition probabilities (s$^{-1}$) corresponding to the atomic spectral lines.

These values are in each case constants that are determined beforehand. Consequently, the temperature calculation section 15 can calculate the temperature of the measurement location of the measurement subject 2 by substituting the intensity ratio (In/Im) of the atomic spectral lines in Expression (1).

The temperature calculation section 15 may be for example a PC. Also, the temperature calculation section 15 may comprise for example a display section that displays the calculated temperature. The temperature calculation section 15 may also comprise for example a transmission section that transmits information indicating the calculated temperature to another device.

It should be noted that the optical intensity ratio calculation section and the temperature calculation section 15 may also be constituted by a single PC. Also, the calibration sections 9, the optical intensity ratio calculation section 11 and the temperature calculation section 15 may be constituted by a single PC. The construction of the various sections is not restricted to a specific construction.

Next, an example of the operation of a temperature measurement device 20 will be described.

First of all, a measurement subject 2 is generated within an individual container 1. For example, the user of the temperature measurement device 20 may cause a measurement subject 2 constituted by a plasma, explosion, or chemical reaction or the like to be generated within the individual container 1.

When the measurement subject 2 is generated, the optical input section 3 collects the emission spectrum that is emitted by the measurement subject 2 at a measurement location separated by a focal point distance 13 from the optical input section 3. On collecting the emission spectrum that is emitted by the measurement subject 2 at the measurement location, the optical input section 3 supplies this collected emission spectrum to the amount of light adjustment section 6 by the transmission path 5.

The amount of light adjustment section 6 supplies the emission spectrum that is supplied by the optical input section 3 by the transmission path 5. When this emission spectrum is supplied thereto, the amount of light adjustment section 6 adjusts the amount of light of the supplied emission spectrum. On adjusting the amount of light of the emission spectrum, the amount of light adjustment section 6 supplies the emission spectrum, whose amount of light has thus been adjusted, to the wavelength selection section 7 by the transmission path 5.

The wavelength selection section 7 supplies the emission spectrum that has been supplied thereto by the amount of light adjustment section 6 by the transmission path 5. On being thus supplied with the emission spectrum, the wavelength selection section 7 extracts optical components having the wavelengths λa, λb and λc from this thus-supplied emission spectrum. On extracting the optical components having the wavelengths λa, λb and λc, the wavelength selection section 7 supplies to the respective detectors 8a, 8b and 8c light having the wavelengths λa, λb and λc, by the transmission path 5.

The detectors 8a, 8b and 8c are supplied light of the respective wavelengths λa, λb and λc, by the transmission path 5. The detectors 8a, 8b and 8c convert the light with which they are respectively supplied to voltages. When the thus-supplied light is converted to voltage, the detectors 8a, 8b and 8c supply the voltages that are thereby generated respectively to the calibration sections 9a, 9b and 9c.

The calibration sections 9a, 9b and 9c are respectively supplied with voltages obtained by conversion from light by the detectors 8a, 8b and 8c. When they are thus supplied with these voltages, the calibration sections 9a, 9b and 9c calculate the intensities of the light supplied to the respective detectors 8a, 8b and 8c, based on these supplied voltages. On thus calculating the optical intensities, the calibration sections 9a, 9b and 9c transmit to the optical intensity ratio calculation section 11 information indicating the intensities of the light having the respective wavelengths λa, λb and λc.

The optical intensity ratio calculation section 11 receives this information indicating the intensities of the light having the wavelengths λa, λb and λc. On receiving these items of information, the optical intensity ratio calculation section 11 calculates the intensity ratio of the atomic spectral lines emitted by the measurement location of the measurement subject 2, based on these items of information. On calculating the intensity ratio of the atomic spectral lines, the optical intensity ratio calculation section 11 transmits to the temperature calculation section 15 information indicating the intensity ratio of the calculated atomic spectral lines.

The temperature calculation section 15 receives the information indicating the intensity ratio of the atomic spectral lines calculated by the optical intensity ratio calculation section 11. On receiving this information indicating the intensity ratio of the atomic spectral lines, the temperature calculation section 15 calculates the temperature of the measurement location in accordance with Expression (1). On calculating the temperature of the measurement location, the temperature calculation section 15 presents information indicating the temperature of the measurement location to the outside. For example, in the case where the temperature calculation section 15 comprises a display section, the temperature calculation section 15 displays the temperature of the measurement location on the display section. Also, if the temperature calculation section 15 comprises a transmission section, the temperature calculation section 15 transmits information indicating the temperature of the measurement location to another device through the transmission section.

The temperature measurement device 20 terminates the temperature measurement operation when the temperature calculation section 15 presents the information indicating the temperature of the measurement location to the outside.

It should be noted that the temperature measurement device 20 may also measure the intensity of light having two wavelengths, namely, wavelength λc and wavelength λd, from the wavelength region where there are no atomic spectral lines. For example, the wavelength λc may be close to the wavelength λa, while the wavelength λd is close to the wavelength λb. In this case, the light having the wavelength λc is the continuous optical component in the vicinity of light having the wavelength λa. Consequently, the intensity of the light having the wavelength λc is close to the intensity of the continuous optical components of the light having the wavelength λa. By subtracting the intensity of the light having the wavelength λc from the intensity of the light having the wavelength λa, the temperature measurement device 20 can calculate the intensity of the atomic spectral line having the wavelength λa that is emitted by the measurement location of the measurement subject 2 more accurately. Likewise, by subtracting the intensity of the light having the wavelength λd from the intensity of the light having the wavelength λb, the temperature measurement device 20 can calculate the intensity of the atomic spectral line having the wavelength λb emitted by the measurement location of the measurement subject 2 more accurately.

Also, the temperature measurement device 20 may infer the intensity of the continuous optical component having the wavelength λa by measuring the intensity of the continuous optical component in the vicinity of the wavelength λa for a plurality of points. Likewise, the temperature measurement device 20 may infer the intensity of the continuous optical component having the wavelength λb by measuring the intensity of the continuous optical component in the vicinity of the wavelength λb for a plurality of points. The number of points of the continuous optical component whose intensity is measured by the temperature measurement device 20 is not restricted to a specified number.

A temperature measurement device 20 constructed as described above can accurately measure the intensity of the atomic spectral lines emitted by the measurement location of the measurement subject, by removing the continuous optical component having the wavelengths of the atomic spectral lines. In this way, the temperature measurement device 20 can accurately calculate the intensity ratio of the atomic spectral lines emitted by the measurement location of the measurement subject, and, as a result, can accurately calculate the temperature of the measurement location of the measurement subject.

(Second Embodiment)

Next, a second embodiment will be described.

Figure 3:
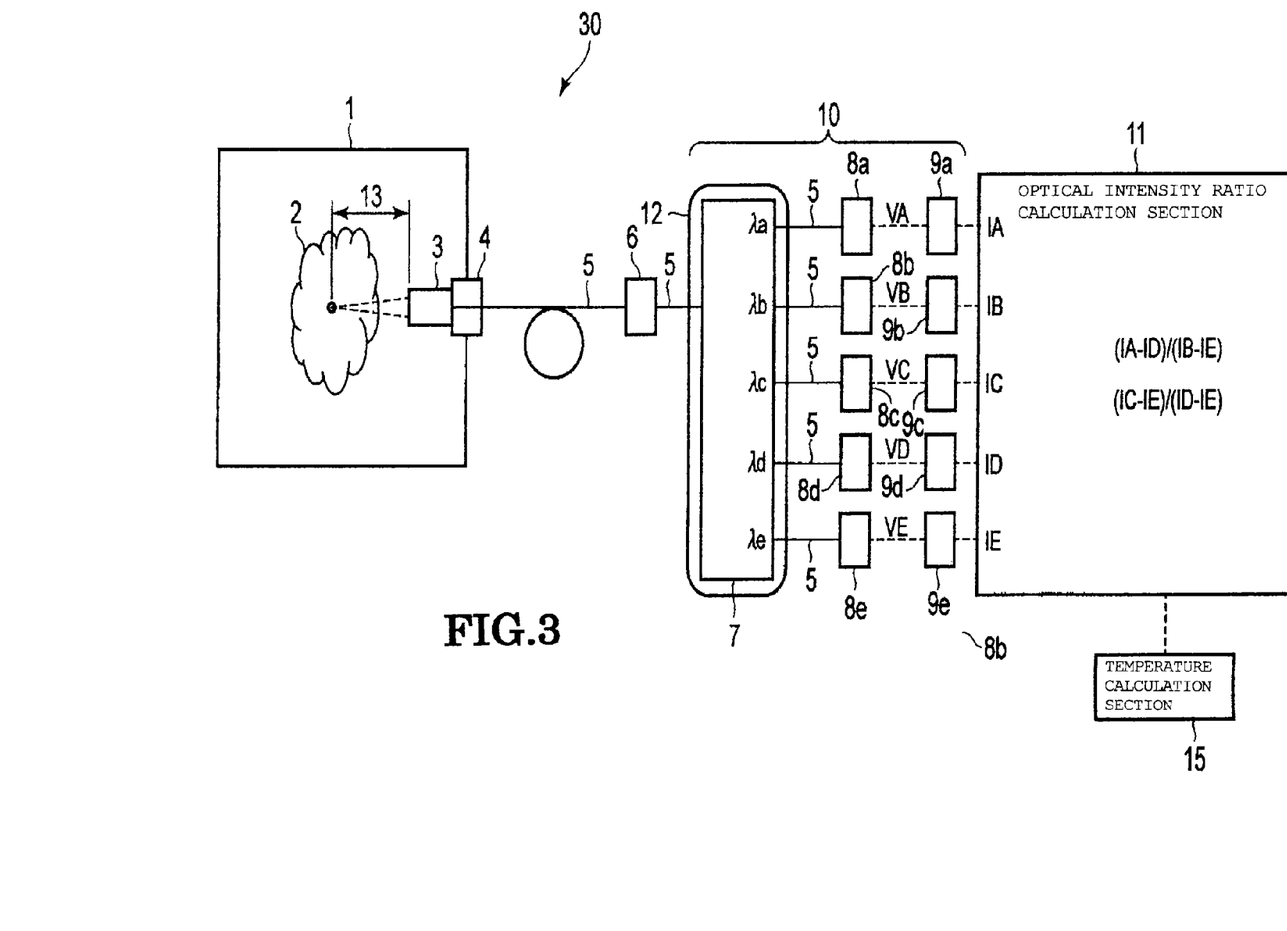
FIG. 3 is a view showing diagrammatically an example layout of a temperature measurement device according to a second embodiment.

A temperature measurement device according to the second embodiment differs from the temperature measurement device 20 according to the first embodiment in that the temperature of the measurement subject 2 is measured based on the intensities of three or more atomic spectral lines emitted by the measurement subject 2 and the intensity of an optical component having a wavelength other than the wavelength of these atomic spectral lines. Accordingly, a detailed description concerning other aspects thereof may be dispensed with.

The temperature measurement device calculates the temperature of the measurement subject 2, based on the intensity ratio of a pair of two or more atomic spectral lines. In the second embodiment, the temperature measurement device calculates the intensity ratio from two atomic spectral lines (spectral line pair) of copper and calculates the intensity ratio from two atomic spectral lines of fluorine. The temperature measurement device calculates the temperature of the measurement subject 2 from the intensity ratio of an atomic spectral line pair of copper and the intensity ratio of an atomic spectral line pair of fluorine. This is described in detail below.

FIG. 3 is a view showing diagrammatically an example layout of a temperature measurement device 30 according to the second embodiment.

As shown in FIG. 3, the temperature measurement device 30 additionally comprises detectors 8d and 8e and calibration sections and calibration sections 9d and 9e. The detectors 8d and 8e are optically connected with the wavelength selection section 7 through the transmission path 5. The calibration sections 9d and 9e are respectively electrically connected with the detectors 8d and 8e. Also, the calibration sections 9d and 9e are electrically connected with the optical intensity ratio calculation section 11.

The wavelength selection section 7 extracts light of the wavelengths of three or more atomic spectral lines and light having a single wavelength in a wavelength region where there are no atomic spectral lines. In the second embodiment, the wavelength selection section 7 extracts light having the wavelength λa and the wavelength λb of two atomic spectral lines of copper (Cu), the wavelength λc and the wavelength λd of two atomic spectral lines of fluorine (F), and a single wavelength λe in a wavelength region where there are no atomic spectral lines.

The wavelength selection section 7 supplies light having the extracted wavelengths λa to λe to the respective detectors 8a to 8e. The detectors 8a to 8e convert the light which is thus supplied to voltages. When the thus-supplied light has been converted to voltages, the detectors 8a to 8e supply these voltages, obtained by conversion of the supplied light, to the respective calibration sections 9a to 9e. From the supplied voltages, the calibration sections 9a to 9e calculate the intensity of the light supplied to the detectors 8 by the wavelength selection section 7.

The calibration section 9a supplies information indicating the intensity (IA) of light having the wavelength λa to the optical intensity ratio calculation section 11. The calibration section 9b supplies information indicating the intensity (IB) of light having the wavelength λb to the optical intensity ratio calculation section 11. The calibration section 9c supplies information indicating the intensity (IC) of light having the wavelength λc to the optical intensity ratio calculation section 11. The calibration section 9d supplies information indicating the intensity (ID) of light having the wavelength λd to the optical intensity ratio calculation section 11. The calibration section 9e supplies information indicating the intensity (IE) of light having the wavelength λb to the optical intensity ratio calculation section 11.

The optical intensity ratio calculation section 11 receives the information indicating the intensities (IA to IE) of the light having the wavelengths λa to λe. On receiving these items of information, the optical intensity ratio calculation section 11 calculates the intensity ratio of the atomic spectral line pair of copper and the intensity ratio of the atomic spectral line pair of fluorine. The calculation procedure is described below.

The optical intensity ratio calculation section 11 calculates the intensity of the atomic spectral lines emitted by the measurement location of the measurement subject 2. Just as in the case of the first embodiment, the optical intensity ratio calculation section 11 can obtain the atomic spectral line intensity (Icn) of the wavelength λa that is emitted by the measurement subject 2 by subtracting IE from IA. Likewise, the optical intensity ratio calculation section 11 can obtain the atomic spectral line intensity (Icm) of the wavelength λb emitted by the measurement subject 2 by subtracting IE from IB. Consequently, the optical intensity ratio calculation section 11 can calculate the intensity ratio (Icn/Icm) of the atomic spectral line pair of copper by the following expression.

$$Icn/Icm=(IA-IE)/(IB-IE)$$

Likewise, the optical intensity ratio calculation section 11 can calculate the intensity ratio (Ifn/Ifm) of the atomic spectral line pair of fluorine by the following expression.

$$Ifn/Ifm=(IC-IE)/(ID-IE)$$

On calculating the intensity ratio of the atomic spectral line pair of copper and the intensity ratio of the atomic spectral line pair of fluorine, the optical intensity ratio calculation section 11 transmits information indicating the intensity ratio of the atomic spectral line pair of copper and information indicating the intensity ratio of the atomic spectral line pair of fluorine to the temperature calculation section 15.

The temperature calculation section 15 receives these items of information. On receiving these items of information, the temperature calculation section 15 calculates the temperature of the measurement location of the measurement subject 2, based on the intensity ratio of the atomic spectral line pair of copper and the intensity ratio of the atomic spectral line pair of fluorine. The procedure of calculation of the temperature by the temperature calculation section 15 is described below.

First of all, the temperature calculation section 15 determines the intensity ratio of the atomic spectral line pair to be employed for calculation of the temperature. Specifically, the temperature calculation section 15 determines the intensity ratio of the atomic spectral line pair that is most suitable for the calculation of the temperature.

Figure 4:
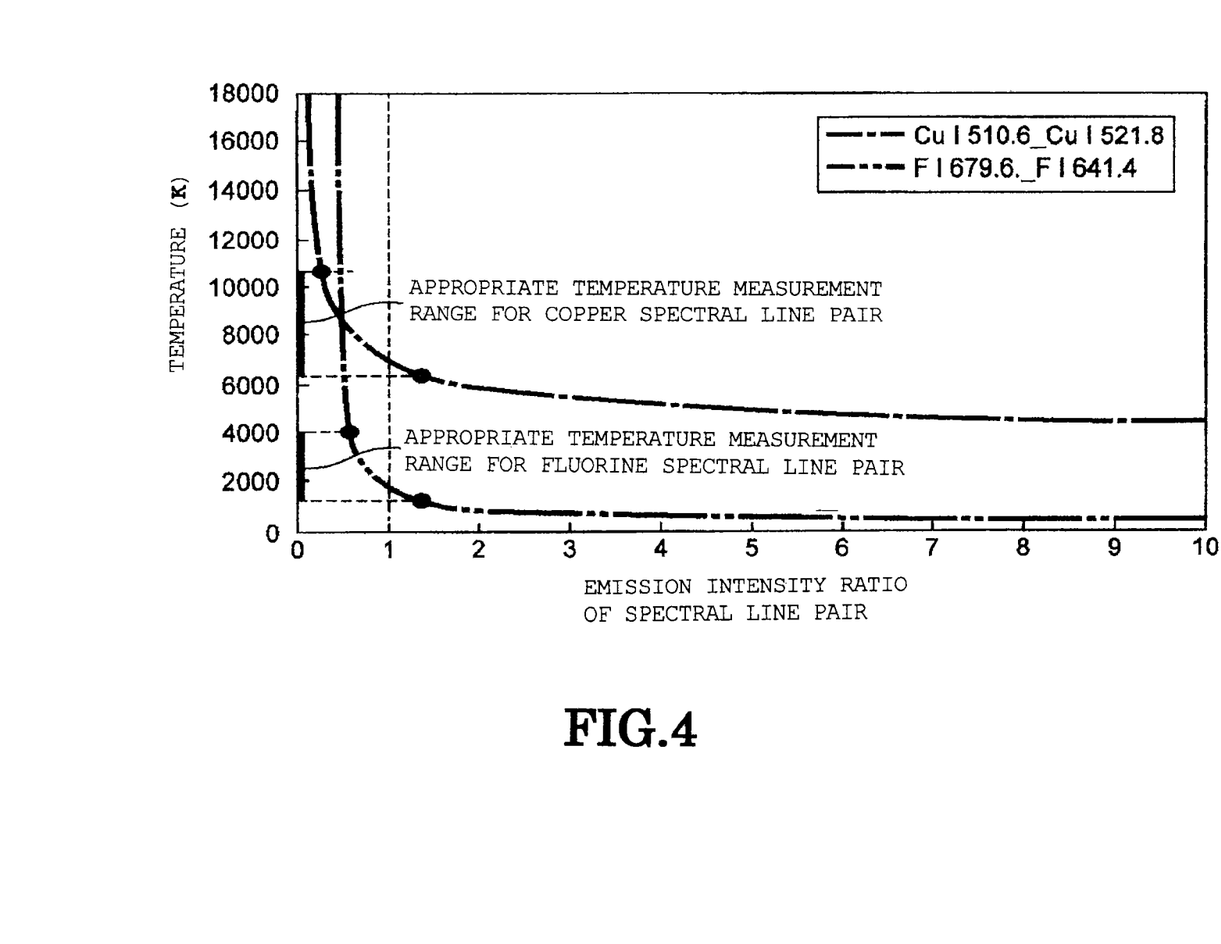
FIG. 4 is a view showing the relationship between temperature and the intensity ratio of an atomic spectral line pair.

FIG. 4 is a view showing the relationship of intensity and temperature of the atomic spectral lines of copper and the relationship of intensity and temperature of the atomic spectral lines of fluorine, based on logical values.

As shown in FIG. 4, there is a considerable difference between the characteristics of the curve showing the relationship of the intensity ratio and temperature of the atomic spectral lines of copper and the characteristics of the curve showing the relationship of the intensity ratio and temperature of the atomic spectral lines of fluorine.

In the temperature region that is sought to be measured by the temperature measurement device 30, if the change of the calculated temperature with respect to the change of the intensity ratio of the atomic spectral line pair is excessively large or excessively small, the temperature measurement device 30 is unable to calculate the temperature accurately. For example, if the calculated change of temperature is excessively large with respect to the change in the intensity ratio of the atomic spectral line pair, the temperature measurement device 30 is unable to calculate the temperature accurately even if slight noise is generated in the intensity ratio of the atomic spectral line pair. Also, if the calculated change of temperature is excessively small with respect to the change in intensity ratio of the atomic spectral line pair, the temperature measurement device 30 finds it difficult to calculate the precise temperature without requiring accurate measurement of the intensity ratio of the atomic spectral line pair up to high values (for example at least 10).

Consequently, a temperature region in which temperature can be accurately measured by employing the intensity ratio of an atomic spectral line pair is constituted by a temperature region (appropriate temperature measurement range) such that the change in the calculated temperature corresponding to change in the intensity ratio of this atomic spectral line pair is within a fixed range. Such an appropriate temperature measurement range is determined in accordance with for example the system or measurement conditions required for measurement. For example, the appropriate temperature measurement range may be defined as a temperature region that satisfies the following expression.

[Math 2]

$$1000 \leq \left| \frac{dT}{d}\left(\frac{I_n}{I_m}\right) \right| \leq 2000 \qquad \text{Expression (2)}$$

where In>Im is satisfied.

As shown in FIG. 4, in the relationship of intensity ratio and temperature of an atomic spectral line pair of copper, the range satisfying Expression (2) is roughly 6000 K to 10,000 K. Also, in the relationship of intensity ratio and temperature of an atomic spectral line pair of fluorine, the range satisfying Expression (2) is roughly 2000 K to 4000 K. Consequently, if the temperature of the measurement location of the measurement subject 2 is roughly 2000 K to 4000 K, the temperature measurement device 30 calculates the temperature using the intensity ratio of the atomic spectral line pair of fluorine. Also, if the temperature of the measurement location of the measurement subject 2 is roughly 6000 K to 10,000 K, the temperature measurement device 30 calculates the temperature using the intensity ratio of the atomic spectral line pair of copper.

Using Expression (1), the temperature calculation section 15 calculates respective temperatures of the measurement location of the measurement subject 2 based on the intensity ratio of the atomic spectral line pair of copper and the intensity ratio of the atomic spectral line pair of fluorine. When calculating respective temperatures of the measurement location of the measurement subject 2, the temperature calculation section 15 decides on the atomic spectral line pair whose intensity ratio is to be used for temperature calculation as being the atomic spectral line pair in respect of which the temperature that is calculated therefrom falls within the appropriate temperature measurement range. In other words, if the temperature that is calculated from the intensity ratio of the atomic spectral lines falls within the appropriate temperature measurement range for the atomic spectral lines in question, the temperature calculation section 15 identifies the intensity ratio of the atomic spectral lines in question as being the intensity ratio of the atomic spectral line pair that is to be used for temperature calculation. For example, if the temperature calculation section 15 calculates the temperature of the measurement location, from the intensity ratio of the atomic spectral line pair of copper, as 7000 K (in other words, within the appropriate temperature measurement range of the atomic spectral line pair of copper), the temperature calculation section 15 identifies the intensity ratio of the atomic spectral line pair of copper as being the intensity ratio of the atomic spectral line pair that is to be used for temperature calculation.

Once it has identified the atomic spectral line pair whose intensity ratio is to be employed for temperature calculation, the temperature calculation section 15 designates the temperature calculated from the intensity ratio of this atomic spectral line pair as the temperature of the measurement location of the measurement subject 2. Once it has determined the temperature of the measurement location of the measurement subject 2, the temperature calculation section 15 presents information indicating the temperature of the measurement location to the outside. When this information indicating the temperature of the measurement location has been presented to the outside, the temperature measurement device 30 terminates the temperature measurement operation.

Just as in the case of the first embodiment, the temperature measurement device 30 may then measure the intensity of the light at a plurality of points in a wavelength region where there are no atomic spectral lines, and calculate the intensity of the atomic spectral lines emitted from the measurement location of the measurement subject 2 from these measured intensities.

In a temperature measurement device constructed as above, the intensity ratio of a plurality of atomic spectral line pairs of different appropriate temperature measurement ranges can be changed over in accordance with the temperature of the measurement subject. In this way, the temperature measurement device 30 can select the intensity ratio of the atomic spectral line pair in accordance with the temperature measurement range and thus measure the temperature of the measurement subject more accurately. Also, with this temperature measurement device 30, an expanded temperature measurement region can be achieved.

(Third Embodiment)

Next, a third embodiment will be described.

Figure 5:
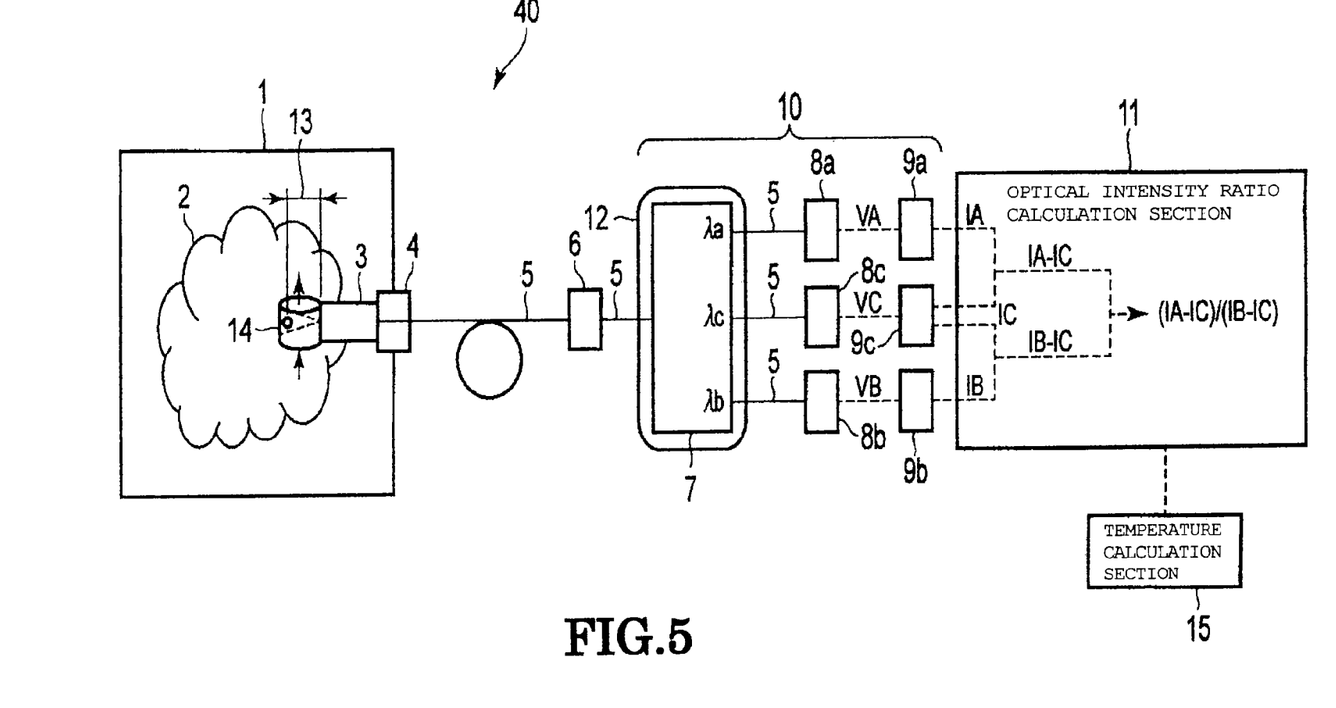
FIG. 5 is a view showing diagrammatically an example layout of a temperature measurement device according to a third embodiment.

This temperature measurement device according to the third embodiment differs from the temperature measurement device according to the first embodiment, in that a cover is arranged at the tip of the optical input section 3. A detailed description of other aspects may therefore be omitted.

FIG. 5 is a view showing diagrammatically an example layout of a temperature measurement device 40 according to the third embodiment.

As shown in FIG. 5, the temperature measurement device 40 comprises a cover 14 that is arranged at the tip of the optical input section 3.

The cover 14 is provided so that the optical input section 3 collects only the emission spectrum of the measurement location of the measurement subject 2. The cover 14 prevents light that is emitted for example from the measurement subject 2 or individual container 1 from locations further than the focal point distance 13 from being directed onto the optical input section 3. In this way, the optical input section 3 can collect the emission spectrum of the measurement location of the measurement subject 2 with better definition.

The cover 14 may be tubular, with openings at the top and bottom of the cover 14. Thanks to the openings at the top and bottom of the cover 14, measurement subjects 2 can flow smoothly into the interior of the cover 14. In this way, the cover 14 can prevent to the utmost degree disturbance of the flow of the measurement subjects 2.

The cover 14 is provided, in its side face, with a hole for installation of the optical input section 3. The hole that is provided in the cover 14 passes through the side face of the cover 14. The tip of the optical input section 3 is fixed in the hole provided in the cover 14. In this way, the optical input section 3 can collect light from the interior of the cover 14. It should be noted that the tip of the optical input section 3 may or may not project into the interior of the cover 14.

The diameter of the cover 14 is slightly larger than the focal point distance 13 of a lens that is arranged in the optical input section 3. In this way, the optical input section 3 can collect the emission spectrum of a measurement location that is separated by the focal point distance 13 in the interior of the cover 14. Also, the cover 14 prevents the optical input section 3 from collecting light emitted by measurement subjects 2 that are further away than the focal point distance 13.

The interior of the cover 14 is processed as a specular surface. The physical properties produced by this specular processing mean that the light that is emitted therefrom shows little change with change of temperature. Consequently, the cover 14 does not readily emit light that changes with change in temperature. As a result, the optical input section 3 can collect the emission spectrum of the measurement location without any possibility of collecting light emitted as a result of change of temperature of the cover 14.

The cover 14 has strength capable of withstanding for example shock or heat generated by the measurement subjects 2. For example, the cover 14 may be formed of metal or the like, but there is no specific restriction regarding the physical properties of the cover 14.

When measurement subjects 2 are generated within the individual container 1, these measurement subjects 2 flow smoothly into the interior of the cover 14. The emission spectrum of the measurement location of the measurement subject 2 in the interior of the cover 14 is collected by the optical input section 3. The subsequent temperature calculation procedure is the same as in the case of the first embodiment.

It should be noted that the third embodiment may also comprise the characteristic features of the second embodiment. Also, the cover 14 need not be of tubular shape. The shape of the cover 14 is not restricted to being a specific shape, so long as it is a shape whereby the light that is collected by the optical input section 3 is restricted to the emission spectrum generated by the measurement location of the measurement subject 2.

A temperature measurement device 40 constructed as described above is capable of collecting the emission spectrum of the measurement location of the measurement subject with even better definition. Consequently, the temperature measurement device 40 can calculate the temperature of the measurement location of the measurement subject even more accurately. Also, the temperature measurement device 40 can calculate the temperature of the measurement location of the measurement subject while disturbing to the least degree possible the flow of the measurement subjects.

What is claimed is:

1. A temperature measurement device that measures temperature using an emission spectrum of a measurement subject, comprising:
    a light collection means for collecting an emission spectrum of said measurement subject;
    an extraction means for extracting light having a wavelength of atomic spectral lines and light having another wavelength in a wavelength region where there are no atomic spectral lines, from said emission spectrum collected by said light collection means;
    an optical intensity calculation means for calculating an intensity of light for each of wavelength extracted by said extraction means; and
    a temperature measurement means for calculating a temperature of said measurement subject based on an intensity of each of beams calculated by said optical intensity calculation means,
    wherein said extraction means extracts two beams having atomic spectral line wavelengths and at least one beam having said another wavelength in the wavelength region where there are no atomic spectral lines,
    wherein said temperature measurement means further comprises:
        an optical intensity ratio calculation means for calculating an intensity ratio of an atomic spectral line pair emitted by said measurement subject, based on said intensity of said two beams having wavelengths of said atomic spectral lines extracted by said extraction means, and said at least one beam intensity having a wavelength in the wavelength region in which there are no atomic spectral lines, extracted by said extraction means, and
        a temperature calculation means for calculating a temperature of said measurement subject, based on said intensity ratio of said atomic spectral line pair calculated by said optical intensity ratio calculation means,
    wherein said optical intensity ratio calculation means calculates two or more intensity ratios of atomic spectral line pairs emitted by said measurement subject, and
    wherein said temperature calculation means calculates the temperature of said measurement subject by deciding on said intensity ratio that is to be used for temperature calculation, of said two or more intensity ratios calculated by said optical intensity ratio calculation means based on temperature measurement regions of said atomic spectral line pairs used for intensity ratio calculation by said optical intensity ratio calculation means, from said intensity ratio that is thus decided upon.

2. The temperature measurement device according to claim 1,
    wherein said temperature calculation means identifies an intensity ratio of an atomic spectral line pair as an intensity ratio that is to be used for calculation of a temperature of said measurement subject on the basis that said temperature of said measurement subject is included in an appropriate temperature measurement range of said atomic spectral line pair.

3. The temperature measurement device according to claim 1,
    wherein said optical intensity ratio calculation means calculates an intensity ratio of atomic spectral lines by calculating a ratio of two values obtained by respectively subtracting an intensity of a beam from a wavelength region where there are no atomic spectral lines from intensities of two beams having wavelengths of atomic spectral lines.

4. The temperature measurement device according to claim 1,
    wherein said measurement subject is constituted by arc plasma generated in a gas containing sulfur hexafluoride, using electrodes containing copper, and
    said atomic spectral line wavelengths are any of 493 nm, 500 nm, 502 nm, 504 nm, 507 nm, 511 nm, 515 nm, 518 nm, 522 nm, 540 nm, 548 nm, 553 nm, 561 nm, 565 nm, 567 nm, 571 nm, 579 nm, 586 nm, 625 nm, 636 nm, 642 nm, 657 nm, 658 nm, 677 nm, 688 nm, 684 nm, 686 nm, 689 nm, 691 nm, 705 nm, 714 nm, 721 nm, 732 nm, 734 nm, 741 nm, 743 nm, 744 nm, 749 nm, 750 nm, 755 nm, 757 nm, 776 nm, or 781 nm.

5. The temperature measurement device according to claim 1,
    wherein said measurement subject is constituted by arc plasma generated in a gas containing carbon dioxide, using electrodes containing copper, and
    said atomic spectral line wavelengths are any of 493 nm, 502 nm, 504 nm, 507 nm, 511 nm, 515 nm, 522 nm, 561 nm, 579 nm, 741 nm, and 743 nm.

6. The temperature measurement device according to claim 1, wherein said light collection means further comprises a light collection restriction means for restricting a range of collection of the emission spectrum of said measurement subject.

7. The temperature measurement device according to claim 6,
    wherein said light collection restriction means is of tubular shape with openings at a top and bottom, having an inside surface processed to a specular finish and provided with a mounting port for fixing said light collection means in a side face thereof, and in said light collection means, said light collection restriction means is fixed by connecting with said mounting port, and said light collection means collects the emission spectrum of light from the measurement subject flowing into an interior of said light collection restriction means.

\* \* \* \* \*